United States Patent
Sato et al.

(10) Patent No.: US 12,090,743 B2
(45) Date of Patent: Sep. 17, 2024

(54) SHEET-SHAPED REINFORCING FIBER SUBSTRATE AND MANUFACTURING METHOD THEREFOR

(71) Applicant: TORAY INDUSTRIES, INC., Tokyo (JP)

(72) Inventors: Yasuhiro Sato, Otsu (JP); Tamotsu Suzuki, Otsu (JP); Ryota Nakao, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 74 days.

(21) Appl. No.: 17/295,265

(22) PCT Filed: Nov. 29, 2019

(86) PCT No.: PCT/JP2019/046706
§ 371 (c)(1),
(2) Date: May 19, 2021

(87) PCT Pub. No.: WO2020/111215
PCT Pub. Date: Jun. 4, 2020

(65) Prior Publication Data
US 2022/0009197 A1 Jan. 13, 2022

(30) Foreign Application Priority Data
Nov. 30, 2018 (JP) ................. 2018-224812

(51) Int. Cl.
*B32B 5/26* (2006.01)
*B29C 70/30* (2006.01)
(Continued)

(52) U.S. Cl.
CPC ............... *B32B 5/26* (2013.01); *B29C 70/30* (2013.01); *B32B 5/12* (2013.01); *B32B 7/09* (2019.01);
(Continued)

(58) Field of Classification Search
CPC .... B32B 5/26; B32B 5/12; B32B 7/09; B32B 2260/023; B32B 2262/106; B29C 70/30;
(Continued)

(56) References Cited

U.S. PATENT DOCUMENTS

| 6,107,220 A * | 8/2000 | Popper ..................... D04H 3/14 |
| | | 156/181 |
| 2012/0177872 A1* | 7/2012 | Tsai .......................... B32B 5/28 |
| | | 428/113 |
| 2013/0251958 A1* | 9/2013 | Gawn ................... B29C 70/083 |
| | | 156/60 |

FOREIGN PATENT DOCUMENTS

| JP | 2001-524169 A | 11/2001 |
| JP | 2003-13352 A | 1/2003 |

(Continued)

OTHER PUBLICATIONS ip.com translation of JP2014159099A (Year: 2024).*
(Continued)

*Primary Examiner* — Michael Zhang
(74) *Attorney, Agent, or Firm* — Birch, Stewart, Kolasch & Birch, LLP

(57) ABSTRACT

The present invention aims to provide a sheet-shaped reinforcing fiber substrate having shear deformability to conform to a three dimensional shape and restraining the generation of waste pieces to realize a large improve in the yield of reinforcing fibers and a reduction in production cost, and also provide a production method therefor.

The sheet-shaped reinforcing fiber substrate has a layered structure containing N layers (N being an integer of 3 or more) produced by arranging a plurality of reinforcing fiber bundles with appropriate lengths and meets the requirements (1) to (5) given below:
(1) in each layer, mutually adjacent reinforcing fiber bundles are aligned parallel to each other in such a
(Continued)

manner that the clearance between mutually adjacent reinforcing fiber bundles is not smaller than the width of the reinforcing fiber bundles, (2) the reinforcing fiber bundles in a layer and those in the layer located immediately above or below and in contact therewith are aligned in different directions, (3) the length direction of the reinforcing fiber bundles in a randomly selected odd-numbered no'th layer (no being an odd number not less than 3 and not more than N) and the length direction of the reinforcing fiber bundles in the (no-2)'th layer are parallel to each other and the reinforcing fiber bundles in each layer do not overlap each other, (4) in the case where N is 4 or more, the length direction of the reinforcing fiber bundles in a randomly selected even-numbered ne'th layer (ne being an even number not less than 4 and not more than N) and the length direction of the reinforcing fiber bundles in the (ne-2)'th layer are parallel to each other and the reinforcing fiber bundles in each layer do not overlap each other, and (5) mutually intersecting reinforcing fiber bundles are joined together in at least part of the intersection regions where a reinforcing fiber bundles in any of the odd-numbered layers directly overlaps a reinforcing fiber bundle in any of the even-numbered layers.

8 Claims, 13 Drawing Sheets

(51) Int. Cl.
*B29K 307/04* (2006.01)
*B32B 5/12* (2006.01)
*B32B 7/09* (2019.01)

(52) U.S. Cl.
CPC ..... *B29K 2307/04* (2013.01); *B32B 2260/023* (2013.01); *B32B 2262/106* (2013.01)

(58) Field of Classification Search
CPC ........ B29K 2307/04; D04H 3/04; D04H 3/00; C08J 5/04; C08J 5/048
See application file for complete search history.

(56) References Cited

FOREIGN PATENT DOCUMENTS

| JP | 2005-536580 A | | 12/2005 |
| JP | 2014159099 A | * | 9/2014 |
| JP | 2018-165421 A | | 10/2018 |
| WO | WO98/17852 A1 | | 4/1998 |
| WO | WO 2004/001115 A1 | | 12/2003 |

OTHER PUBLICATIONS

International Search Report, issued in PCT/JP2019/046706, PCT/ISA/210, dated Mar. 3, 2020.

Written Opinion of the International Searching Authority, issued in PCT/JP2019/046706, PCT/ISA/237, dated Mar. 3, 2020.

* cited by examiner

[Fig. 1]
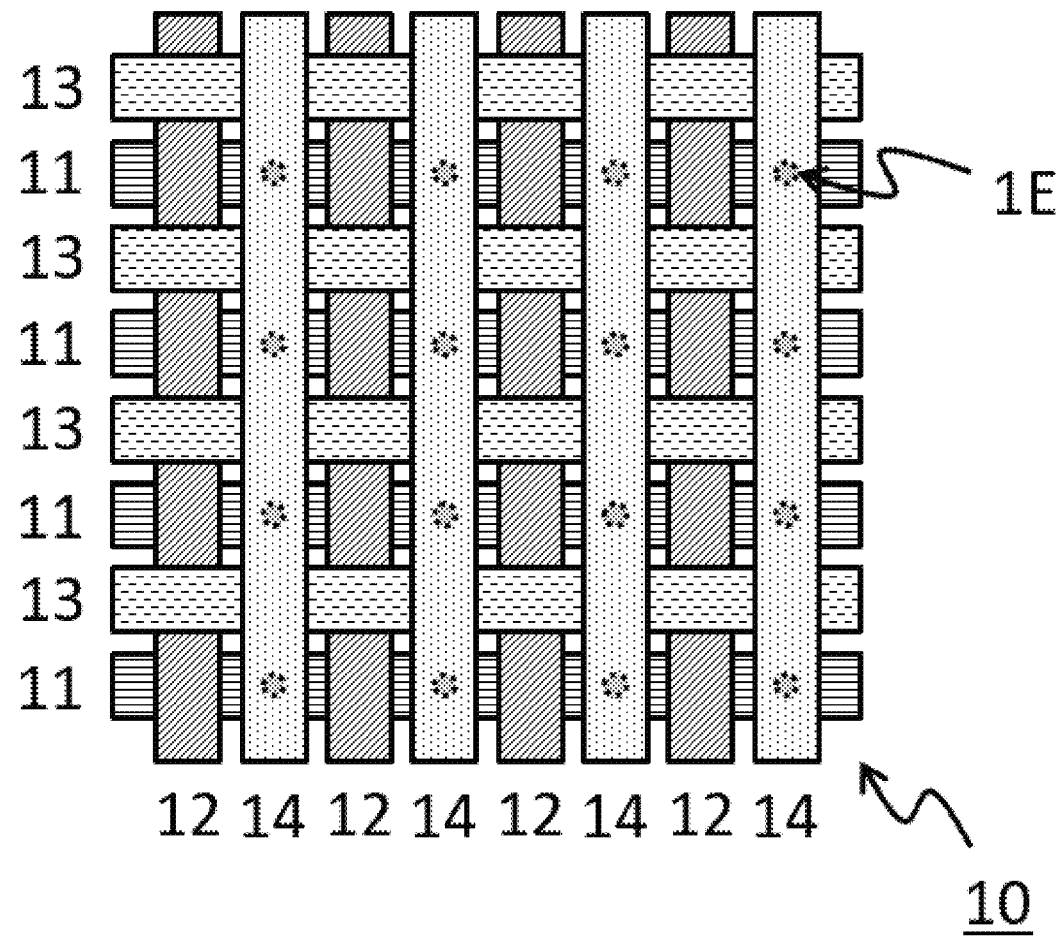

[Fig. 2a]
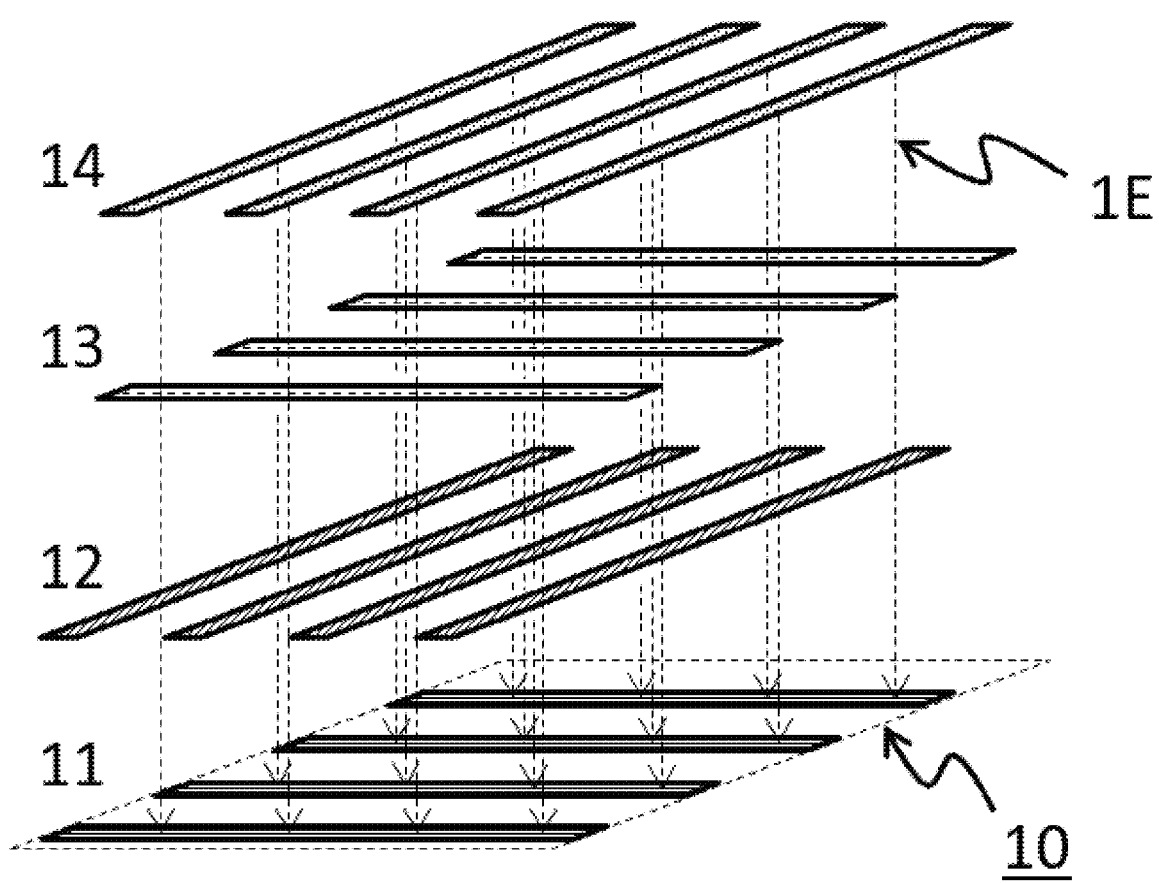

[Fig. 2b]
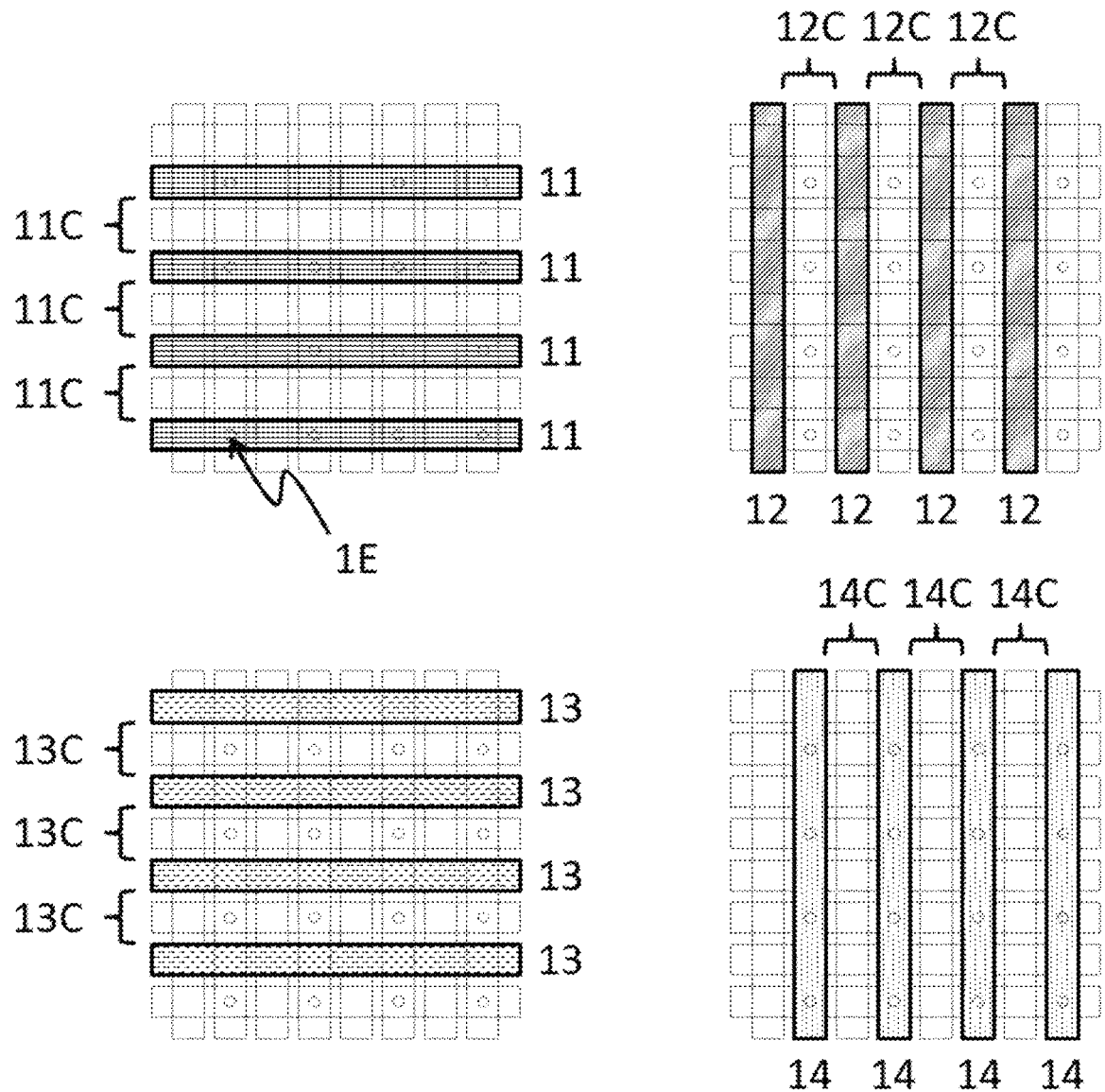

[Fig. 2c]
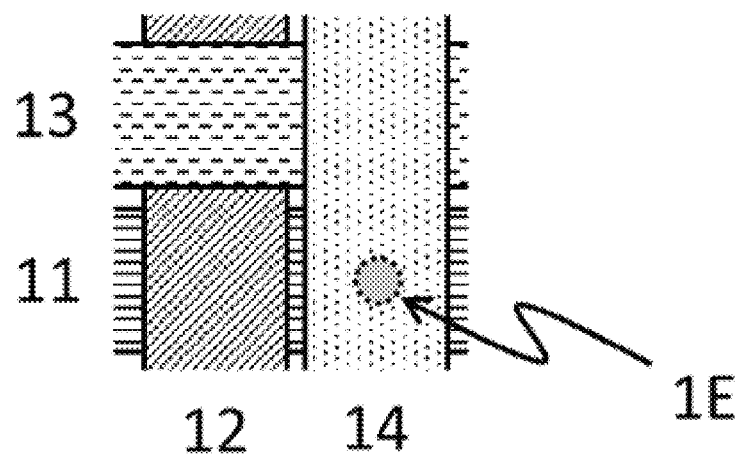

[Fig. 2d]
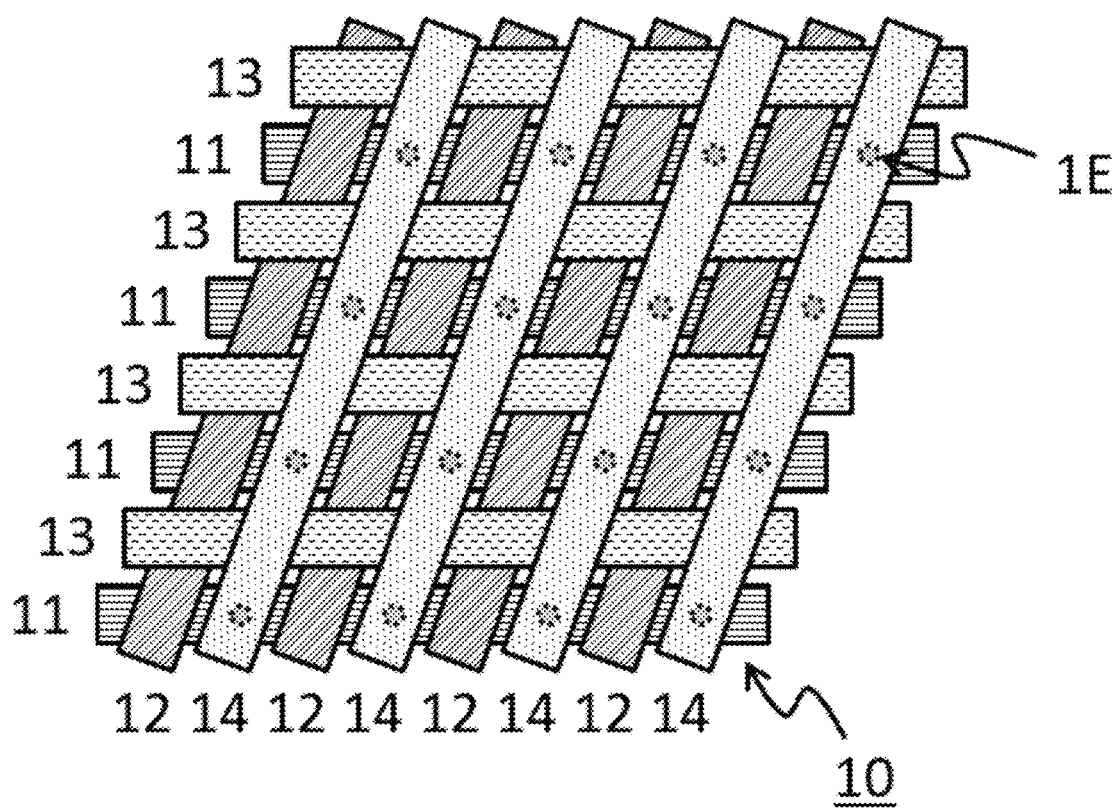

[Fig. 2e]
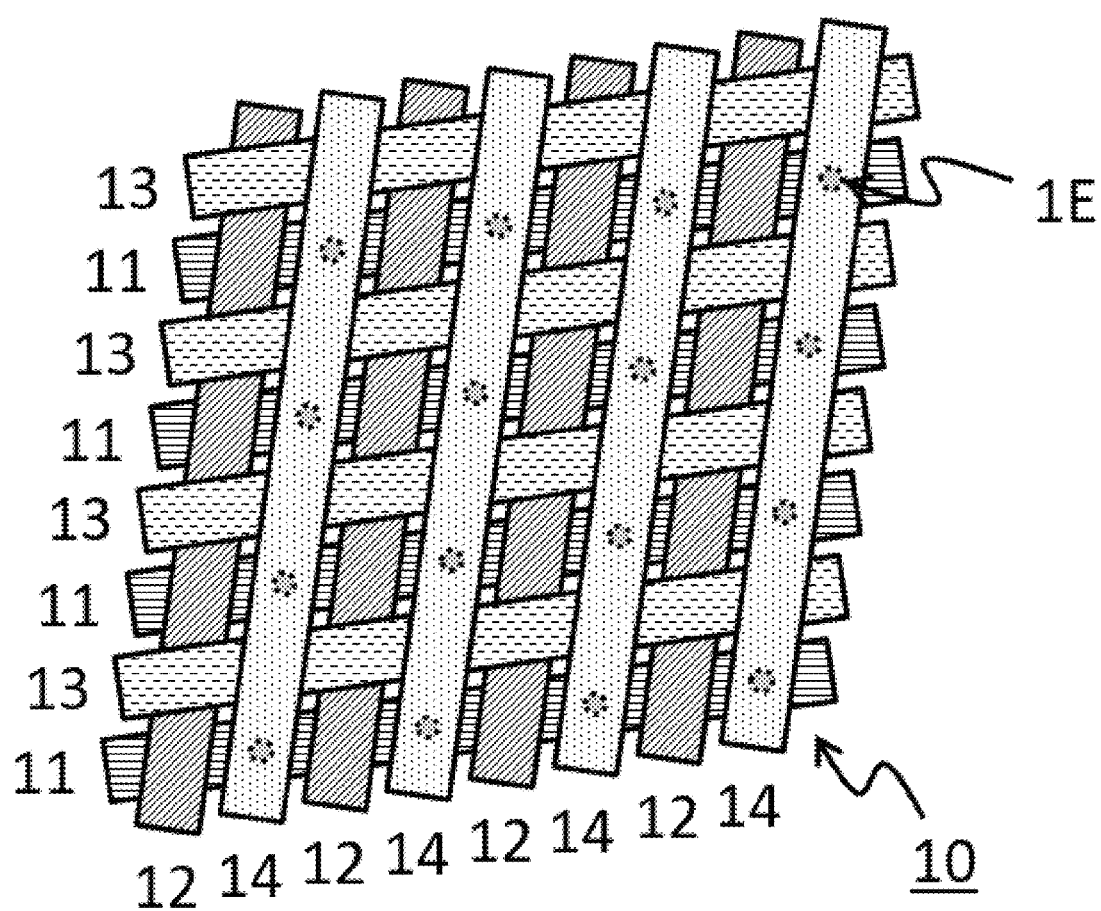

[Fig. 3]
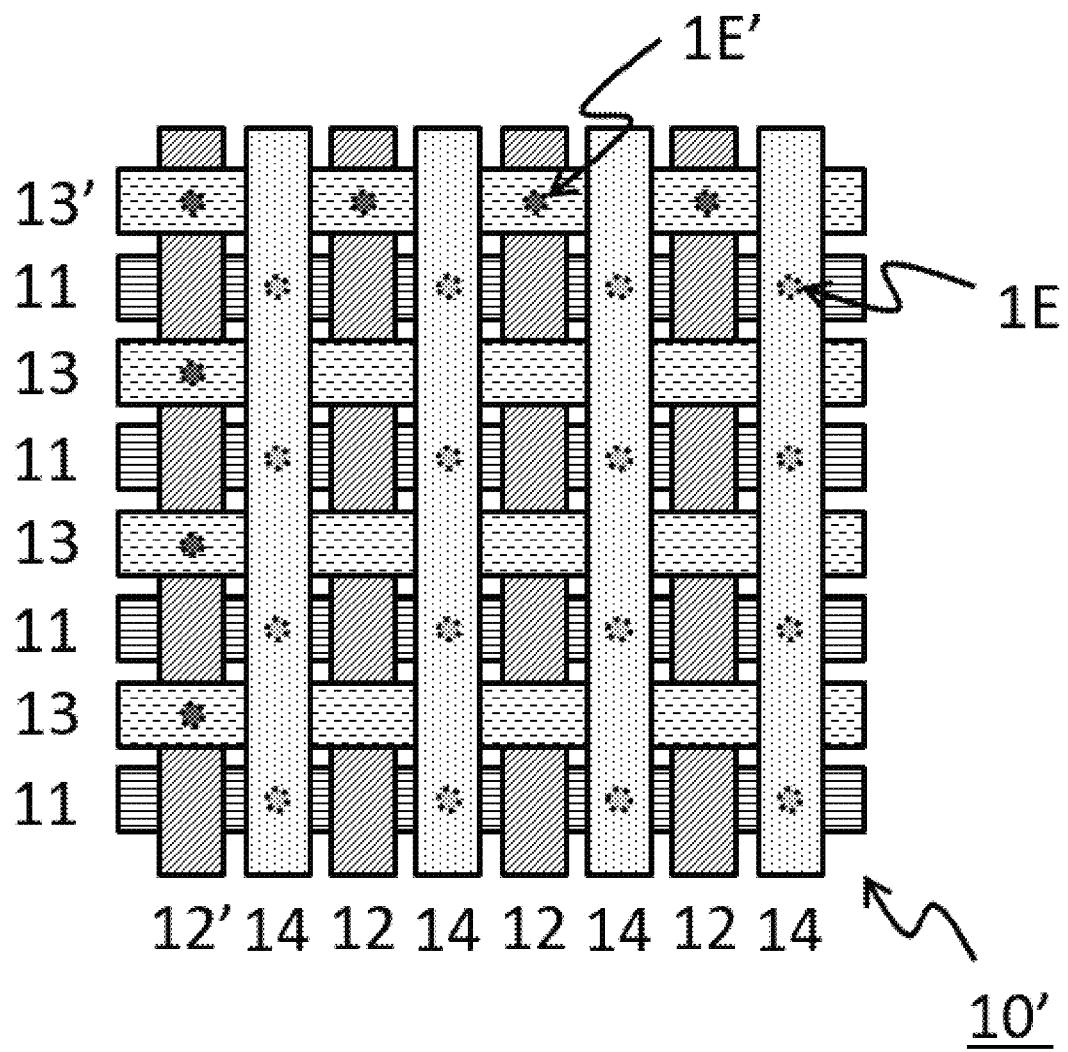

[Fig. 4]
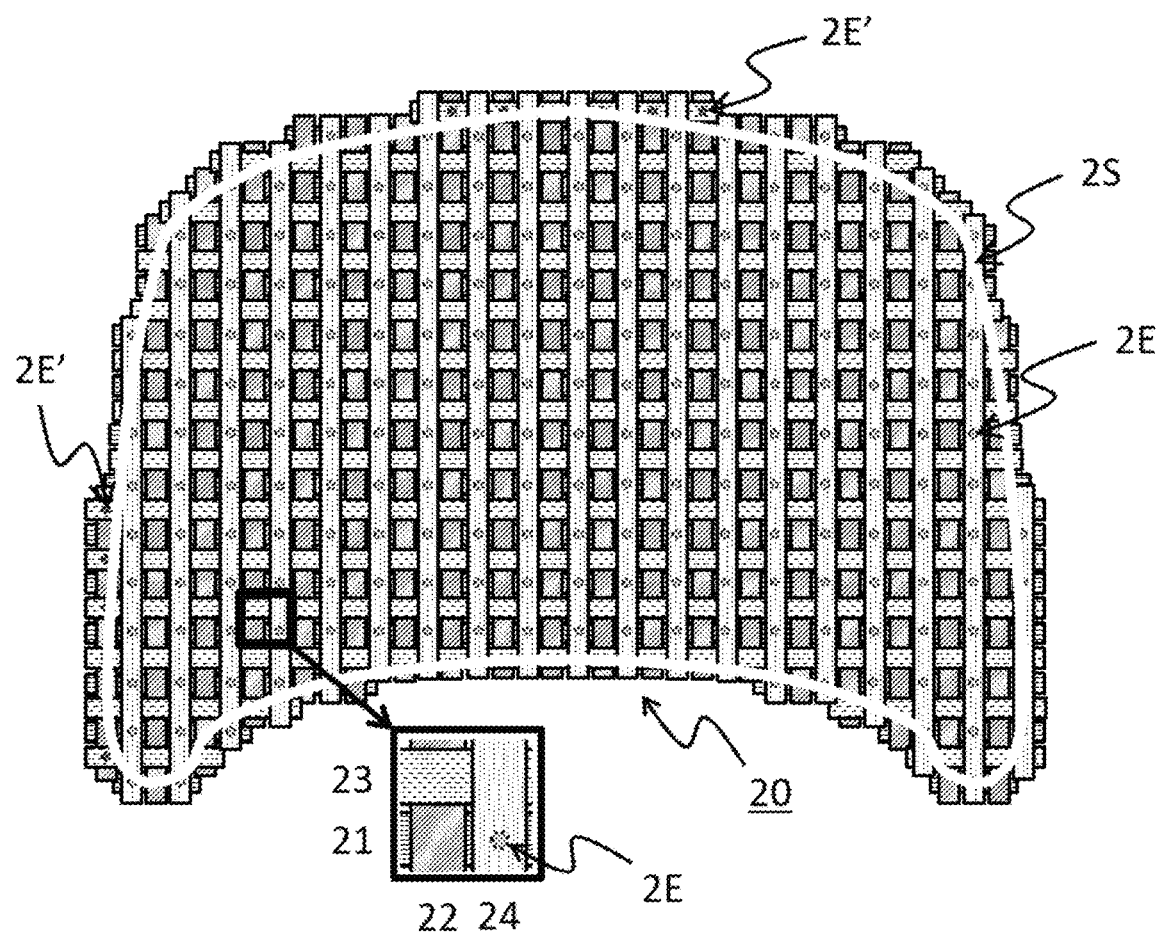

[Fig. 5]
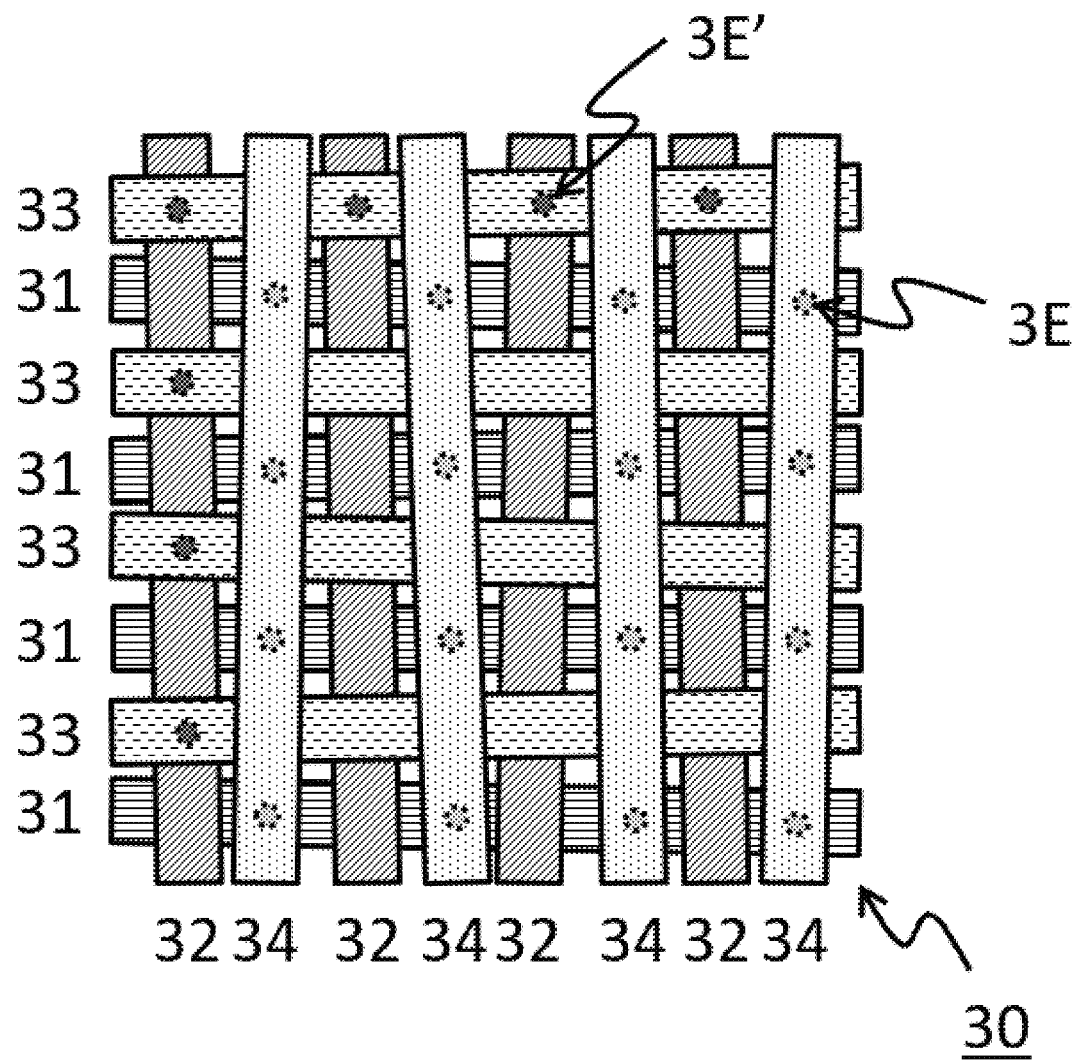

[Fig. 6]
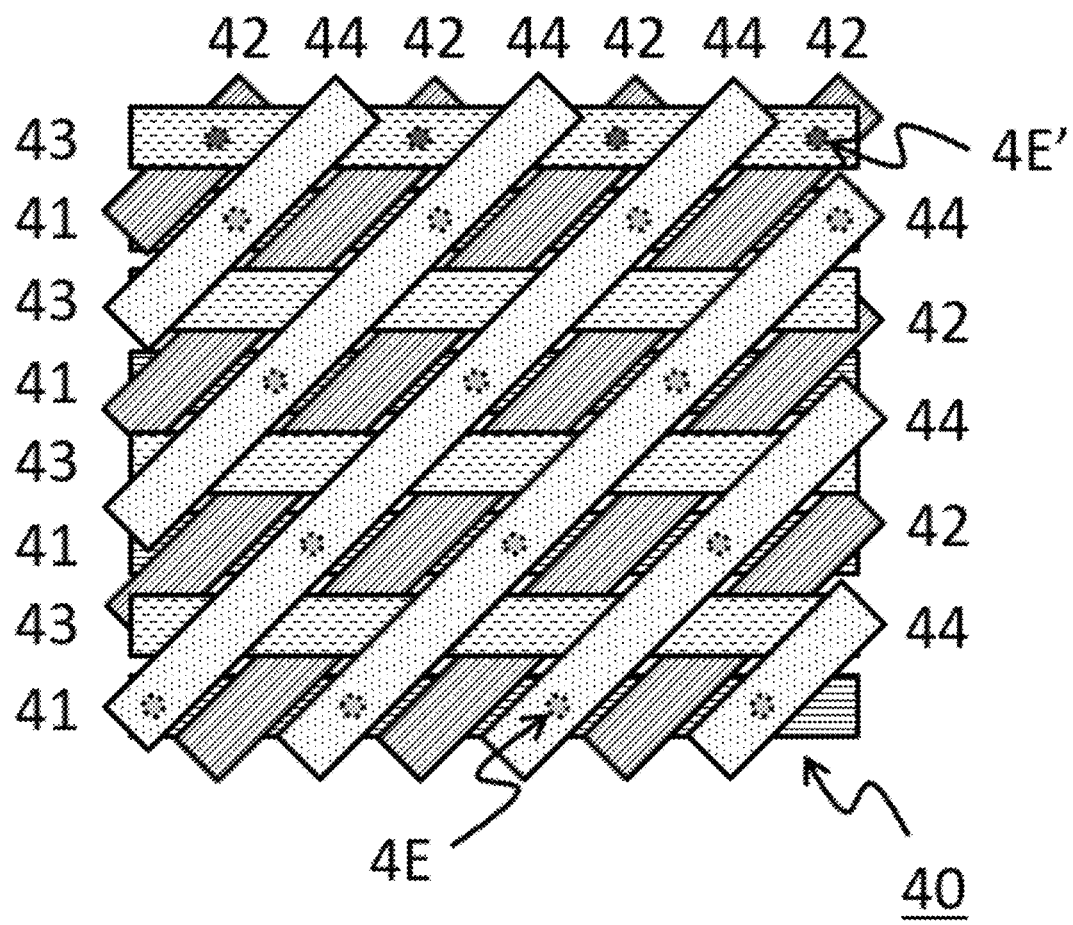

[Fig. 7]
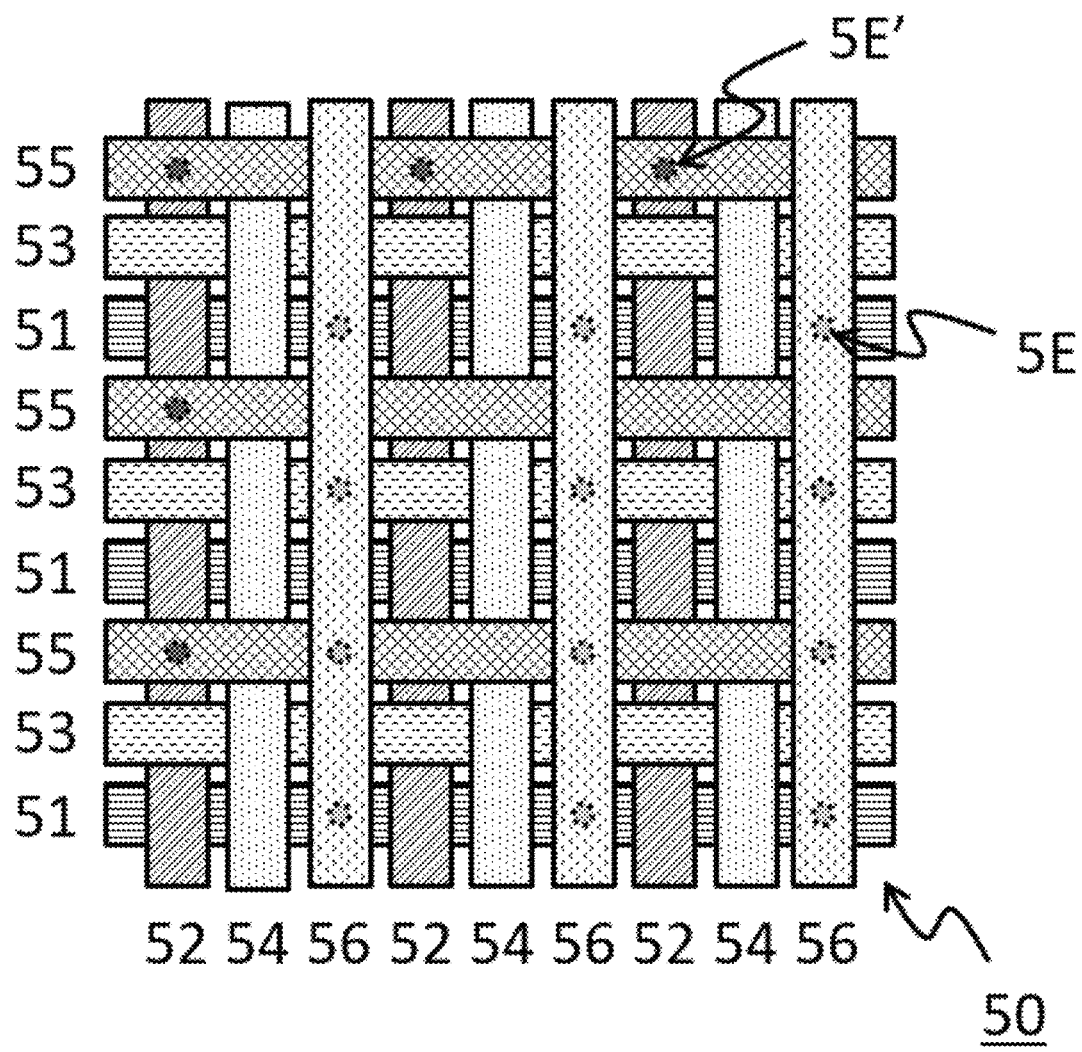

[Fig. 8]
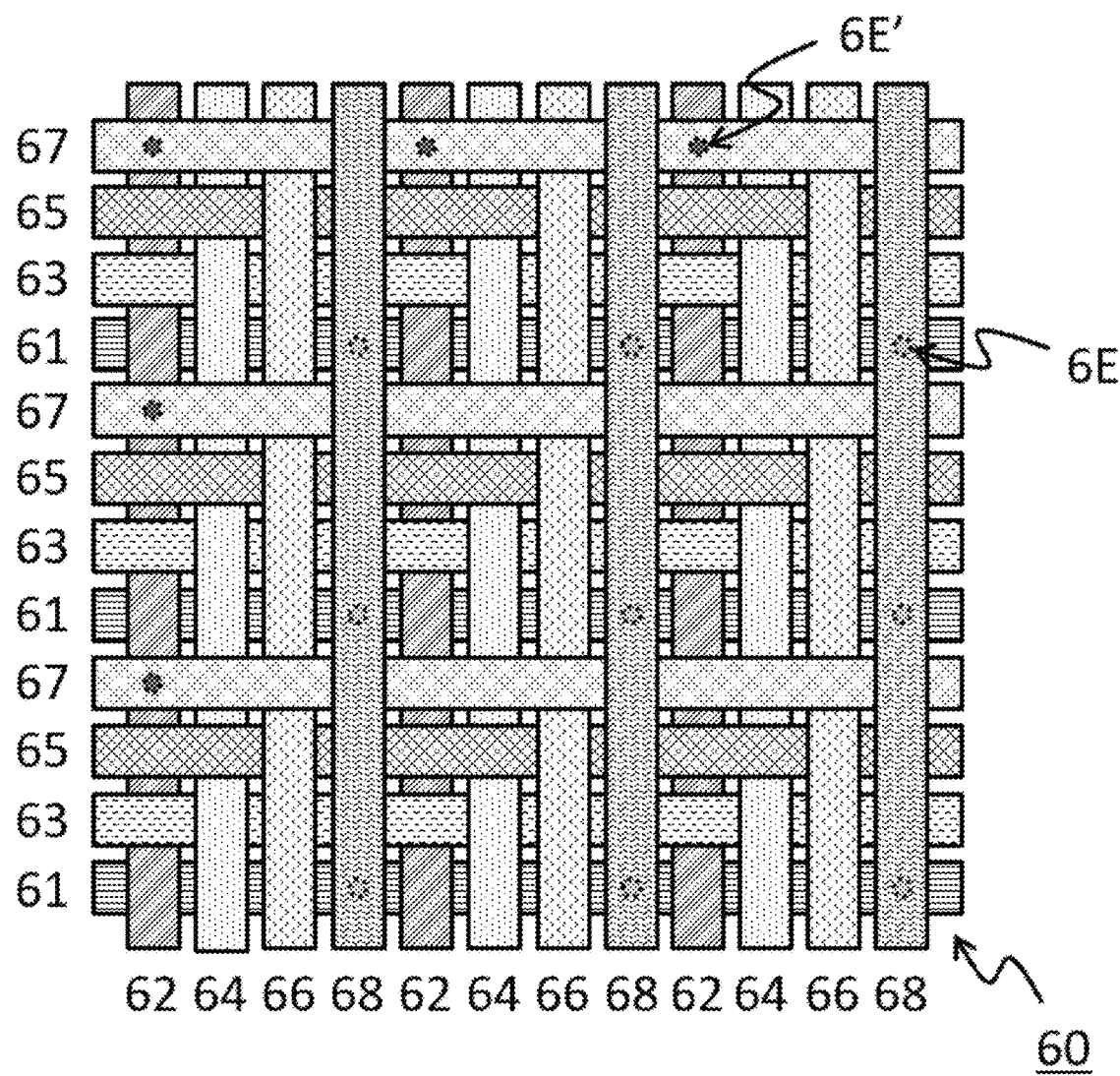

[Fig. 9]
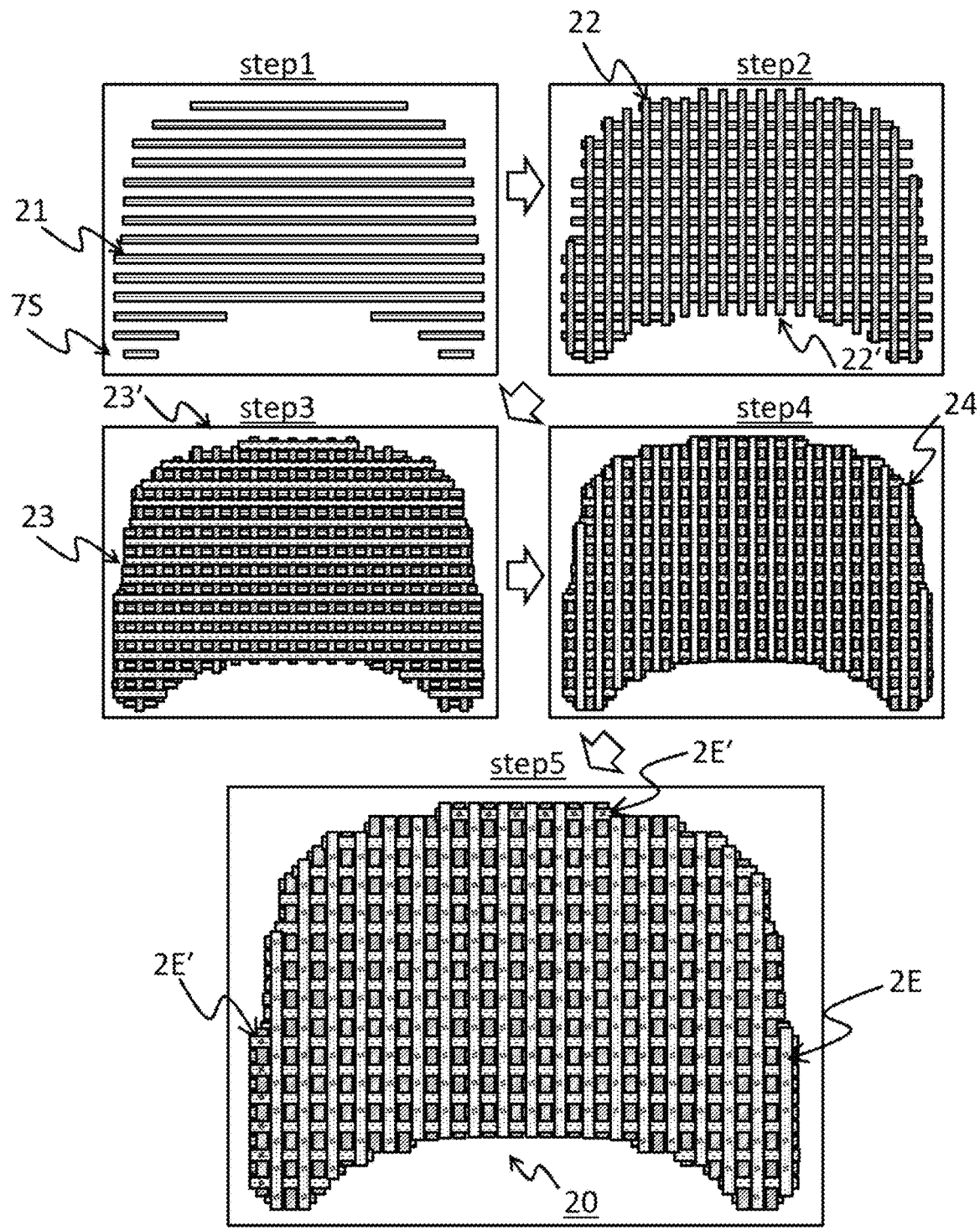

SHEET-SHAPED REINFORCING FIBER SUBSTRATE AND MANUFACTURING METHOD THEREFOR

TECHNICAL FIELD

The present invention relates to a sheet-shaped reinforcing fiber substrate containing a plurality of reinforcing fiber bundles and a method for production of the sheet-shaped reinforcing fiber substrate.

BACKGROUND ART

The RTM (resin transfer molding) method has been conventionally known as a method for molding a fiber reinforced material. In a normal process of the RTM method, a layer stack containing a sheet-shaped reinforcing fiber substrate is placed in a shaping die and shaped into a three dimensional form that is substantially identical to that of the intended fiber reinforced plastic molded article, thereby preparing a preform. Then, this preform is placed in a mold and then a matrix resin such as epoxy resin is injected into the mold to allow the preform to be impregnated with the matrix resin, followed by curing. As a result, a fiber reinforced plastic molded article is obtained.

Common sheet-shaped reinforcing fiber substrates used for the RTM method include a woven fabric substrate composed of warp and weft threads of reinforcing fiber bundles to form cloth and a non-crimp substrate containing parallel reinforcing fiber bundles joined together by, for example, stitching with an auxiliary thread.

A major difference among the features of these sheet-shaped reinforcing fiber substrates is in the susceptibility to shear deformation under an external force.

In a woven fabric substrate, the reinforcing fiber bundles in one group are not joined to the reinforcing fiber bundles in the other group and the sheet like shape is maintained only by the friction between their sections intersecting each other three-dimensionally. Accordingly, a woven fabric substrate tends to undergo shear deformation in the in-plane direction because warp threads and weft threads can move freely when receiving an external force.

Compared to this, the reinforcing fiber bundles in a non-crimp substrate do not form three-dimensional intersections, but the reinforcing fiber bundles are joined together by auxiliary threads, and therefore, the reinforcing fiber bundles are mutually restrained by each other.

Accordingly, a non-crimp fabric substrate is more resistant to shear deformation in the in-plane direction than woven fabric substrates because the reinforcing fiber bundles cannot move freely around joining portions but undergo deformation in a twisted state when receiving an external force.

Thus, the use of a woven fabric substrate, which is resistant to shear deformation, is preferred when producing a preform of a complicated three dimensional shape.

However, woven fabric substrates and non-crimp substrates have a constant width because they are produced continuously. When a preform as described above is formed, therefore, the substrate is trimmed to product shape and the waste pieces from the trimming cannot contribute to the final product. In the case where a woven fabric substrate or a non-crimp substrate is applied to production of fiber reinforced plastic molded articles, therefore, there occurs the problem of a low yield of reinforcing fibers and high production costs.

Thus, attention is now focused on the fiber placement method, in which reinforcing fiber bundles are placed only at those positions where they are necessary for producing a product having a particular shape, instead of cutting out a sheet-shaped reinforcing fiber substrate to product shape from a sheet-shaped reinforcing fiber substrate having a constant width.

Patent document 1 discloses an apparatus that uses this fiber placement method.

In this apparatus, a reinforcing fiber bundle wound up on a bobbin is wound off and sent to the top of a horizontal head, where it is placed in a particular direction on a plane and cut to desired length. Then, another reinforcing fiber bundle is supplied next to the existing reinforcing fiber bundle and cut to a desired length, and this procedure is performed repeatedly to finally forms a layer composed of reinforcing fiber bundles and having a desired contour.

Subsequently, another layer of reinforcing fiber bundles is formed on top of the aforementioned layer in such a manner that these reinforcing fiber bundles are aligned in a direction different from the length direction of those in the first layer, and this procedure is performed repeatedly, followed by joining these layers together. As a result, a sheet-shaped reinforcing fiber substrate is obtained finally.

Thus, in a process that uses the fiber placement method, a sheet-shaped reinforcing fiber substrate is produced by placing reinforcing fiber bundles only at those positions where they are necessary depending on the product shape and therefore, this serves to reduce the generation of waste pieces that do not contribute the final product, leading to a large improve in the yield of reinforcing fibers, which is the major feature of this method.

For a sheet-shaped reinforcing fiber substrate formed by this method, however, unlike a woven fabric substrate in which reinforcing fiber bundles form three-dimensional intersections so that a sheet-shaped structure is maintained by friction, the layers of reinforcing fiber bundles, particularly in the case of dry reinforcing fiber bundles, have to be joined together over the whole layer plane by using a resin binder, auxiliary threads, etc. Therefore, a sheet-shaped reinforcing fiber substrate formed by this method, as well as a non-crimp substrate, cannot easily undergo in-plane shear deformation under an external force as compared to woven fabric substrates.

Patent document 2, on the other hand, discloses a method relating to a non-crimp woven fabric (substrate) in which layers composed of reinforcing fiber bundles are joined only partly, instead of being joined over the whole layer plane, to enable easy shear deformation required of a sheet-shaped reinforcing fiber substrate.

Even when using this method, however, the reinforcing fiber bundles do not form three-dimensional intersections as in the case of a woven fabric substrate, and the reinforcing fiber bundles cannot develop sufficient forces to support each other in a subsequent step where they are deformed largely into a three dimensional shape. Consequently, the positions of the reinforcing fiber bundles cannot be controlled as desired, making it difficult to produce a fiber reinforced plastic molded article having stable physical properties.

Compared to this, Patent document 3 discloses a method in which reinforcing fiber bundles are wound continuously around a mandrel and subsequently cut to an intended shape to form a sheet-shaped reinforcing fiber substrate.

Although this method serves to form a structure that considerably resembles a woven fabric substrate in which reinforcing fiber bundles form three-dimensional intersections (hereinafter this structure is referred as quasi-woven fabric), the layers composed of reinforcing fiber bundles are still joined together with a tackifier over the whole layer plane and it is impossible to expect easy in-plane shear deformation under an external force.

Furthermore, the sheet-shaped reinforcing fiber substrate produced from reinforcing fiber bundles wound around a mandrel has a tubular structure and therefore, waste pieces from trimming to a desired shape still cannot contribute to the final product as in the case of a common woven fabric substrate or non-crimp substrate. Accordingly, an improved yield of reinforcing fibers cannot be expected either.

PRIOR ART DOCUMENTS

Patent Documents

Patent document 1: U.S. Published Patent Application No. 2013/0233471
Patent document 2: Published Translation of PCT International Publication JP 2013-525140
Patent document 3: U.S. Pat. No. 5,204,033

SUMMARY OF INVENTION

Problems to be Solved by the Invention

The major object of the present invention is to realize an improved productivity in the production of fiber reinforced plastic molded articles by proving a sheet-shaped reinforcing fiber substrate (hereinafter occasionally referred as quasi-woven fabric, but the sheet-shaped reinforcing fiber substrate and the quasi-woven fabric are totally the same in terms of basic concept) having shear deformability to conform to a three dimensional shape and reducing the generation of waste pieces to realize a large improve in the yield of reinforcing fibers and a decrease in production cost, and also proving a production method therefor.

Means of Solving the Problems

The present invention has the following constitutional features [1] to [13] to solve the above problems. Specifically, it provides: [1] A sheet-shaped reinforcing fiber substrate having a layered structure containing N layers (N being an integer of 3 or more) produced by arranging a plurality of reinforcing fiber bundles with appropriate lengths and meeting the requirements (1) to (5) given below:
(1) in each layer, mutually adjacent reinforcing fiber bundles are aligned parallel to each other in such a manner that the clearance between mutually adjacent reinforcing fiber bundles is not smaller than the width of the reinforcing fiber bundles,
(2) the reinforcing fiber bundles in a layer and those in the layer located immediately above or below and in contact therewith are aligned in different directions,
(3) the length direction of the reinforcing fiber bundles in a randomly selected odd-numbered no'th layer (no is an odd number not less than 3 and not more than N) and the length direction of the reinforcing fiber bundles in the (no-2)'th layer are parallel to each other and the reinforcing fiber bundles in these layers do not overlap,
(4) in the case where the N value is 4 or more, the length direction of the reinforcing fiber bundles in a randomly selected even-numbered ne'th layer (ne being an even number not less than 4 and not more than N) and the length direction of the reinforcing fiber bundles in the (ne-2)'th layer are parallel to each other and the reinforcing fiber bundles in these layers do not overlap, and
(5) in at least part of the intersection regions where reinforcing fiber bundles in an odd-numbered layer directly overlap reinforcing fiber bundles in an even-numbered layer, mutually intersecting reinforcing fiber bundles are joined together.

[2] A sheet-shaped reinforcing fiber substrate as set forth in the paragraph [1] having a layered structure containing N layers (N being an integer of 4 or more) produced by arranging a plurality of reinforcing fiber bundles with appropriate lengths, including the first layer in which mutually adjacent reinforcing fiber bundles are aligned parallel to each other in such a manner that the clearance between the mutually adjacent reinforcing fiber bundles is not smaller than the width of the reinforcing fiber bundles, the second layer which is disposed on top of the first layer and in which mutually adjacent reinforcing fiber bundles are aligned parallel to each other in such a manner that they are in a direction different from the length direction of the reinforcing fiber bundles in the first layer and that the clearance between the mutually adjacent reinforcing fiber bundles is not smaller than the width of the reinforcing fiber bundles, the (n-1)'th layer (n being an even number not less than 4 and not more than N) which is disposed on top of the (n-2)'th layer and in which mutually adjacent reinforcing fiber bundles are aligned parallel to each other in such a manner that they are in the same direction as the length direction of the reinforcing fiber bundles in the (n-3)'th layer and do not overlap any of the reinforcing fiber bundles in the first and all other odd-numbered layers up to the (n-3)'th layer and that the clearance between the mutually adjacent reinforcing fiber bundles is not smaller than the width of the reinforcing fiber bundles, and the n'th layer which is disposed on top of the (n-1)'th layer and in which mutually adjacent reinforcing fiber bundles are aligned parallel to each other in such a manner that they are in the same direction as the length direction of the reinforcing fiber bundles in the (n-2)'th layer and do not overlap any of the reinforcing fiber bundles in the second and all other even-numbered layers up to the (n-2)'th layer and that the clearance between the mutually adjacent reinforcing fiber bundles is not smaller than the width of the reinforcing fiber bundles, such layers being stacked repeatedly until n reaches N, and mutually intersecting reinforcing fiber bundles being joined together in at least part of the intersection regions where reinforcing fiber bundles in the first layer directly overlap reinforcing fiber bundles in the N'th layer.

[3] A sheet-shaped reinforcing fiber substrate as set forth in the paragraph [1], wherein N is an odd number of 3 or more; mutually intersecting reinforcing fiber bundles are joined together in at least part of the intersection regions where reinforcing fiber bundles in the first layer intersect reinforcing fiber bundles in any one ($Ne_1$'th layer) of the even-numbered layers from second to (N-1)'th; and mutually intersecting reinforcing fiber bundles are joined together in at least part of the intersection regions where reinforcing fiber bundles in the N'th layer intersect reinforcing fiber bundles in any one ($Ne_N$'th layer) of the even-numbered layers from second to (N-1)'th.

[4] A sheet-shaped reinforcing fiber substrate as set forth in either the paragraph [2] or [3], wherein mutually intersecting reinforcing fiber bundles are joined together in all of the intersection regions of reinforcing fiber bundles described above.

[5] A sheet-shaped reinforcing fiber substrate as set forth in any one of the paragraphs [1] to [4], wherein reinforcing fiber bundles are joined together in at least part of the intersection regions where any reinforcing fiber bundle, among the plurality of all reinforcing fiber bundles belonging to the even-numbered layers, that is adjacent to any of the reinforcing fiber bundles in the even-numbered layers only on one side thereof or any reinforcing fiber bundle, among the plurality of all reinforcing fiber bundles belonging to the odd-numbered layers, that is adjacent to any of the reinforcing fiber bundles in the odd-numbered layers only on one side thereof intersects any other reinforcing fiber bundle.

[6] A sheet-shaped reinforcing fiber substrate as set forth in any one of the paragraphs [1] to [5], wherein each reinforcing fiber bundle is designed to have a length in the length direction that allows the contour to be identical to the shape of the intended fiber reinforced plastic molded article.

[7] A sheet-shaped reinforcing fiber substrate as set forth in any one of the paragraphs [1] to [6], wherein the angle between the length direction of the reinforcing fiber bundles belonging to the odd-numbered layers and the length direction of the reinforcing fiber bundles belonging to the even-numbered layers is anywhere in the range of 45° to 90°.

[8] A sheet-shaped reinforcing fiber substrate as set forth in any one of the paragraphs [1] to [7], wherein the value of N is 4.

[9] A sheet-shaped reinforcing fiber substrate as set forth in any one of the paragraphs [1] to [8], wherein the reinforcing fiber bundles are joined together with a resin binder.

[10] A sheet-shaped reinforcing fiber substrate as set forth in any one of the paragraphs [1] to [8], wherein the reinforcing fiber bundles are joined together by stitching with an auxiliary thread.

[11] A sheet-shaped reinforcing fiber substrate as set forth in any one of the paragraphs [1] to [10], wherein the reinforcing fiber bundles are of carbon fiber.

[12] A production method for a sheet-shaped reinforcing fiber substrate having a layered structure containing N layers (N being an integer of 3 or more) formed by arranging a plurality of reinforcing fiber bundles with appropriate lengths, characterized by including the steps (a) to (f) given below:

(a) a step for forming the first odd-numbered layer by arranging a plurality of reinforcing fiber bundles parallel to each other in such a manner that the clearance between reinforcing fiber bundles is not smaller than the width of the reinforcing fiber bundles, (b) a step for forming the second layer, i.e. the first even-numbered layer, on top of the first odd-numbered layer by arranging a plurality of reinforcing fiber bundles parallel to each other in such a manner that they are aligned in a direction different from the length direction of the reinforcing fiber bundles belonging to the first odd-numbered layer and that the clearance between the reinforcing fiber bundles is not smaller than the width of the reinforcing fiber bundles, (c) a step for forming the odd-numbered no'th layer (no being an odd number not less than 3 and not more than N) on top of the even-numbered layer located one layer down by arranging a plurality of reinforcing fiber bundles parallel to each other in such a manner that they are aligned in the same direction as the length direction of the reinforcing fiber bundles belonging to the odd-numbered layer located two layers down and do not overlap any of the reinforcing fiber bundles in any of the odd-numbered layers already formed and that the clearance between the reinforcing fiber bundles is not smaller than the width of the reinforcing fiber bundles, (d) in the case where the N value is 4 or more, a step for forming the even-numbered ne'th layer (ne being an even number not less than 4 and not more than N) on top of the odd-numbered layer located one layer down by arranging a plurality of reinforcing fiber bundles parallel to each other in such a manner that they are aligned in the same direction as the length direction of the reinforcing fiber bundles belonging to the even-numbered layer located two layers down and do not overlap any of the reinforcing fiber bundles in any of the even-numbered layers already formed and that the clearance between the reinforcing fiber bundles is not smaller than the width of the reinforcing fiber bundles, (e) in the case where the N value is 5 or more, a step for repeating the step (c) and the step (d) alternately until no or ne reaches the predetermined n value, and (f) a step for joining mutually intersecting reinforcing fiber bundles together in at least part of the intersection regions where a reinforcing fiber bundle belonging to any of the odd-numbered layers directly overlaps a reinforcing fiber bundle belonging to any of the even-numbered layers.

[13] A production method for a sheet-shaped reinforcing fiber substrate as set forth in the paragraph [12], wherein the arrangement of reinforcing fiber bundles in the steps (a) to (e) is performed by the fiber placement method.

Advantageous Effects of the Invention

The sheet-shaped reinforcing fiber substrate (quasi-woven fabric) according to the present invention has shear deformability to conform to a three dimensional shape and, due to reduction in the generation of waste pieces, realizes a large improve in the yield of reinforcing fibers and a decrease in production cost. Therefore, it serves to produce fiber reinforced plastic molded articles with high productivity.

BRIEF DESCRIPTION OF THE DRAWINGS

FIG. 1 This is a plan view of a sheet-shaped reinforcing fiber substrate (quasi-woven fabric) 10 according to an embodiment of the present invention.

FIG. 2a This is an oblique perspective view showing a structure of layers composed of reinforcing fiber bundles 11 to 14 in the sheet-shaped reinforcing fiber substrate (quasi-woven fabric) 10.

FIG. 2b This is a plan view showing the clearances 11C to 14C between the reinforcing fiber bundles 11 to 14 belonging to each constituent layer in the sheet-shaped reinforcing fiber substrate (quasi-woven fabric) 10.

FIG. 2c This is a plan view showing constituents of the sheet-shaped reinforcing fiber substrate (quasi-woven fabric) 10.

FIG. 2d This is a plan view showing in-plane shear deformation of the sheet-shaped reinforcing fiber substrate (quasi-woven fabric) 10 under an external force.

FIG. 2e This is a plan view showing in-plane shear deformation of the sheet-shaped reinforcing fiber substrate (quasi-woven fabric) 10 under an external force.

FIG. 3 This is a plan view of a sheet-shaped reinforcing fiber substrate (quasi-woven fabric) 10' in which, in addition to the joining points 1E, the reinforcing fiber bundles 12' and 13' are joined to reinforcing fiber bundles 13 and 12, respectively, in the joining points 1E' where they directly overlap each other.

FIG. 4 This is a plan view of a sheet-shaped reinforcing fiber substrate (quasi-woven fabric) 20 having a contour defined according to the shape of a fiber reinforced plastic molded article.

FIG. 5 This is a plan view of a sheet-shaped reinforcing fiber substrate (quasi-woven fabric) 30 in which the reinforcing fiber bundles 31 to 34 are arranged in randomly inclined angles.

FIG. 6 This is a plan view of a sheet-shaped reinforcing fiber substrate (quasi-woven fabric) 40 in which the length direction of the reinforcing fiber bundles 41 and 42 in odd-numbered layers makes an angle of 45° with the length direction of the reinforcing fiber bundles 42 and 44 in even-numbered layers.

FIG. 7 This is a plan view of a sheet-shaped reinforcing fiber substrate (quasi-woven fabric) 50 in which the value of N, i.e. the number of layers composed of the reinforcing fiber bundles 51 to 56, is 6.

FIG. 8 This is a plan view of a sheet-shaped reinforcing fiber substrate (quasi-woven fabric) 60 in which the value of N, i.e. the number of layers composed of the reinforcing fiber bundles 61 to 68, is 8.

FIG. 9 This shows a production procedure for the sheet-shaped reinforcing fiber substrate (quasi-woven fabric) 20.

DESCRIPTION OF PREFERRED EMBODIMENTS

The embodiments of the present invention are described in detail below with reference to drawings.

A. Constitution of sheet-shaped reinforcing fiber substrate (quasi-woven fabric):

FIG. 1 illustrates the sheet-shaped reinforcing fiber substrate (quasi-woven fabric) 10 according to an embodiment of the present invention and FIGS. 2a to 2c describes in more detail the sheet-shaped reinforcing fiber substrate (quasi-woven fabric) 10 proposed in FIG. 1. For the sheet-shaped reinforcing fiber substrate (quasi-woven fabric) 10, the value of N, i.e. the number of layers composed of reinforcing fiber bundles, is 4. It is noted that the value of N is 4 in the example given in FIG. 1 to FIG. 2c, but it only needs to have a layered structure containing N layers where N is an integer of 3 or more. As illustrated in FIG. 2a, the reinforcing fiber bundles 12 (second layer) are disposed on top of the reinforcing fiber bundles 11 (first layer), the reinforcing fiber bundles 13 (third layer) being disposed on top thereof, the reinforcing fiber bundles 14 (fourth layer) being disposed on top thereof, and the reinforcing fiber bundles in a layer and those in the layer disposed thereon or thereunder and in contact therewith being aligned in different directions. Any reinforcing fiber bundle in the odd-numbered layers (first layer and third layer) or any reinforcing fiber bundle in the even-numbered layers (second layer and fourth layer) does not overlap any other reinforcing fiber bundle in the layers, and mutually adjacent reinforcing fiber bundles in each layer are aligned parallel to each other in such a manner that the clearance between mutually adjacent reinforcing fiber bundles is not smaller than the width of the reinforcing fiber bundles. At the same time, those portions of the first layer composed of the reinforcing fiber bundles 11 and those portions of the fourth layer composed of the reinforcing fiber bundles 14 which directly overlap each other are joined together with a resin binder in the joining points 1E. Thus, in at least part of the intersection regions where reinforcing fiber bundles in an odd-numbered layer and reinforcing fiber bundles in an even-numbered layer directly overlap, mutually intersecting reinforcing fiber bundles are joined together. Accordingly, when, for example, the layers are molded in conformity to a curved shape while maintaining a sheet form, the fiber will slip appropriately to allow the sheet to deform without suffering creases.

In the example shown in these drawings, all reinforcing fiber bundles 11 to 14 in the sheet-shaped reinforcing fiber substrate (quasi-woven fabric) 10 have the same length in the length direction. This is because, in the embodiment shown in FIG. 1, the sheet-shaped reinforcing fiber substrate (quasi-woven fabric) 10 has a substantially square shape and this requires all reinforcing fiber bundles 11 to 14 to have the same length in the length direction. When applying this to an actual molding process, a plurality of reinforcing fiber bundles that vary in length appropriately may be arranged so as to produce a sheet-shaped reinforcing fiber substrate (quasi-woven fabric) having an desired shape as shown below in other drawings.

As illustrated in FIG. 2b, the layers contain reinforcing fiber bundles 11 to 14 and the clearances 11C to 14C between mutually adjacent reinforcing fiber bundles are adjusted in such a manner that they are not smaller than the widths of the reinforcing fiber bundles 11 to 14. It means that in each layer, the clearance between mutually adjacent reinforcing fiber bundles is not smaller than the width of the reinforcing fiber bundles.

In the example shown in this drawing, the length direction of the reinforcing fiber bundles in the odd-numbered layers makes an angle of 90° with the length direction of the reinforcing fiber bundles in the even-numbered layers, but if only the reinforcing fiber bundles in layers that are mutually adjacent and in contact with each other are aligned in different directions, mutually intersecting reinforcing fiber bundles can be joined together in at least part of the intersection regions where reinforcing fiber bundles in an odd-numbered layer directly overlap reinforcing fiber bundles in an even-numbered layers, and these layers can serve to form a sheet-shaped reinforcing fiber substrate.

In addition, the reinforcing fiber bundles 11 and the reinforcing fiber bundles 13, which belong to odd-numbered layers, are parallel to each other, and so are the reinforcing fiber bundles 12 and the reinforcing fiber bundles 14, which belong to even-numbered layers (regarded as parallel if the angles between them is ±2° or less). It means that the length direction of the reinforcing fiber bundles belonging to the third layer and the length direction of the reinforcing fiber bundles belonging to the first layer are parallel to each other, and the length direction of the reinforcing fiber bundles belonging to the fourth layer and the length direction of the reinforcing fiber bundles belonging to the second layer are parallel to each other. The value of N is 4 in this example, but in the case of a sheet having more layers, the above relation can be maintained if the length direction of the reinforcing fiber bundles belonging to any odd-numbered no'th layer (no being an odd number not less than 3 and not more than N) and the length direction of the reinforcing fiber bundles belonging to the (no-2)'th layer are parallel to each other, and the length direction of the reinforcing fiber bundles belonging to any even-numbered ne'th layer (ne being an even number not less than 4 and not more than N) and the length direction of the reinforcing fiber bundles belonging to the (ne-2)'th layer are parallel to each other.

In addition, the reinforcing fiber bundles belonging to the third layer and the reinforcing fiber bundles belonging to the first layer are aligned so that they do not overlap each other, and the reinforcing fiber bundles belonging to the fourth layer and the reinforcing fiber bundles belonging to the second layer are aligned so that they do not overlap each other. The value of N is 4 in this example, but in the case of a sheet having more layers, the above relation can be maintained if the reinforcing fiber bundles belonging to any odd-numbered no'th layer (no being an odd number not less than 3 and not more than N) and the reinforcing fiber bundles belonging to the (no-2)'th layer are aligned so that they do not overlap each other, and the reinforcing fiber bundles belonging to any even-numbered ne'th layer (ne being an even number not less than 4 and not more than N) and the reinforcing fiber bundles belonging to the (ne-2)'th layer are aligned so that they do not overlap each other.

FIG. 2c shows a minimum unit where mutually intersecting reinforcing fiber bundles are joined together in an intersection region where a reinforcing fiber bundle 11 in an odd-numbered layer and a reinforcing fiber bundle 14 in an even-numbered layer directly overlap in the sheet-shaped reinforcing fiber substrate (quasi-woven fabric) 10. Here, a minimum unit is the smallest section whose repetition in two-dimensional directions forms the sheet-shaped reinforcing fiber substrate (quasi-woven fabric) 10. Such a minimum unit of the sheet-shaped reinforcing fiber substrate (quasi-woven fabric) 10 contains four points where the reinforcing fiber bundles 11 to 14 intersect each other, in three of which the form of the sheet is maintained only by the friction in the portions where they directly overlap each other whereas 1E denotes the only joining point where the reinforcing fiber bundle 11 and the reinforcing fiber bundle 14 directly overlap each other. Thus, when the sheet-shaped reinforcing fiber substrate (quasi-woven fabric) 10 receives an external force, three-fourths of all reinforcing fiber bundles can move freely in the whole sheet-shaped reinforcing fiber substrate (quasi-woven fabric), thereby permitting easy in-plane shear deformation in a similar way to woven fabric substrates, as seen in FIG. 2d and FIG. 2e. It is noted that FIG. 1, FIG. 2b, FIG. 2d, and FIG. 2e show a preferred embodiment in which mutually intersecting reinforcing fiber bundles are joined together in all regions where the reinforcing fiber bundles 11 and the reinforcing fiber bundles 14 directly overlap each other, but mutually intersecting reinforcing fiber bundles are required to be joined together only in part of the regions where the reinforcing fiber bundles 11 and the reinforcing fiber bundles 14 directly overlap each other, as long as a sheet form of can be maintained.

In this way, in the sheet-shaped reinforcing fiber substrate (quasi-woven fabric) 10, intersecting sections of reinforcing fiber bundles 11 in the first layer (i.e. the bottom layer of the sheet-shaped reinforcing fiber substrate (quasi-woven fabric) 10) and reinforcing fiber bundles 14 in the fourth layer (i.e. the top layer of the sheet-shaped reinforcing fiber substrate (quasi-woven fabric) 10) are joined together at joining points 1E as described above, but joining points are not limited thereto. Thus, in another good example, the reinforcing fiber bundles 11 are joined to some of the reinforcing fiber bundles 12 in the second layer (i.e. the layer on top of the bottom layer of the sheet-shaped reinforcing fiber substrate (quasi-woven fabric) 10) while the reinforcing fiber bundles 14 are joined to some of the reinforcing fiber bundles 13 in the third layer (i.e. the layer immediately under the top layer of the sheet-shaped reinforcing fiber substrate (quasi-woven fabric) 10), with the reinforcing fiber bundles 12 being joined to some of the reinforcing fiber bundles 13. Accordingly, the form of the sheet can be maintained if reinforcing fiber bundles in odd-numbered layers and reinforcing fiber bundles in even-numbered layers are joined together selectively in at least part of the intersection regions. It is noted that in the case where the value of N is 4 or more, the same concept applies, and the form of the sheet can be maintained if they are joined together selectively in at least part of the intersection regions.

However, from the viewpoint of easy shear deformation, it is desirable for the sheet form of a sheet-shaped reinforcing fiber substrate to be maintained by the friction between reinforcing fiber bundles in regions where they directly overlap each other. As a form of a sheet-shaped reinforcing fiber substrate, therefore, it is preferable that the intersection regions of the first layer composed of the reinforcing fiber bundles 11 and those of the fourth layer composed of the reinforcing fiber bundles 14 are joined together because all of the reinforcing fiber bundles 12 and 13 restrain each other by friction.

The sheet-shaped reinforcing fiber substrate (quasi-woven fabric) 10 described in this example has an N value of 4, i.e. an N value of an even number, but in the case where N is an odd number, a sheet form can be maintained if mutually intersecting reinforcing fiber bundles are joined together in at least part of the intersection regions where reinforcing fiber bundles in the first layer intersect reinforcing fiber bundles in any one ($Ne_1$'th layer) of the even-numbered layers from second to (N-1)'th and in at least part of the intersection regions where reinforcing fiber bundles in the N'th layer intersect reinforcing fiber bundles in any one ($Ne_N$'th layer) of the even-numbered layers from second to (N-1)'th. In the case where $Ne_t < Ne_N$, however, layers are separated and a sheet form cannot be maintained because joining points are not formed between the layers from first to $Ne_1$'th and the layers from $Ne_N$'th to N'th. Therefore, it is essential that the relation $Ne_1 \geq Ne_N$ holds. FIG. 3 shows a sheet-shaped reinforcing fiber substrate (quasi-woven fabric) 10' in which the reinforcing fiber bundle 12', which is one of the reinforcing fiber bundles 12 that is adjacent to any of the reinforcing fiber bundles 14 only on one side thereof, and the reinforcing fiber bundle 13', which is one of the reinforcing fiber bundles 13 that is adjacent to any of the reinforcing fiber bundle 11 only on one side thereof, directly overlap reinforcing fiber bundles 13 and 12, respectively, at joining points 1E' where they are joined together with a resin binder. The requirements for the sheet-shaped reinforcing fiber substrate (quasi-woven fabric) 10' are basically the same as those for the sheet-shaped reinforcing fiber substrate (quasi-woven fabric) 10 except for having the joining points 1E' in addition to the joining points 1E.

In the case of the sheet-shaped reinforcing fiber substrate (quasi-woven fabric) 10, those reinforcing fiber bundles 12 and 13 which are defined in FIG. 1 but located at the position of the reinforcing fiber bundles 12' and 13' defined in FIG. 3 can come off independently as a result of insufficient friction with other reinforcing fiber bundles that they intersect, when the sheet-shaped reinforcing fiber substrate (quasi-woven fabric) 10 is conveyed or when the sheet-shaped reinforcing fiber substrate (quasi-woven fabric) 10 undergoes shear deformation under an external force.

Compared to this, in the case of the sheet-shaped reinforcing fiber substrate (quasi-woven fabric) 10', the reinforcing fiber bundles 12' and 13' are joined to other reinforcing fiber bundles at the joining points 1E' and accordingly prevented from coming off. Therefore, from the viewpoint of the structure of a sheet-shaped reinforcing fiber substrate (quasi-woven fabric), the sheet-shaped reinforcing fiber substrate (quasi-woven fabric) 10' is more preferable than the sheet-shaped reinforcing fiber substrate (quasi-woven fabric) 10.

It is noted however that although in the sheet-shaped reinforcing fiber substrate (quasi-woven fabric) 10' shown in FIG. 3, the reinforcing fiber bundle 12' is joined to reinforcing fiber bundles 13 and the reinforcing fiber bundle 13' are joined to reinforcing fiber bundles 12 at the joining points 1E' in all of their intersection regions, the joining points are not necessarily limited thereto. For example, the reinforcing fiber bundle 12' may be joined to reinforcing fiber bundles 11, and the reinforcing fiber bundle 13' may be joined to reinforcing fiber bundles 14 in their intersection regions. Thus, as long as reinforcing fiber bundles are joined together in at least part of the intersection regions where the reinforcing fiber bundles 12' and 13' intersect any of the other reinforcing fiber bundles, they will not come off independently.

In the sheet-shaped reinforcing fiber substrates (quasi-woven fabrics) 10 and 10', all reinforcing fiber bundles 11 to 14 belonging to each constituent layer have the same length in the length direction to form a rectangular contour, but they do not necessarily have the same length, and appropriate lengths may be adopted according to the shape of the intended fiber reinforced plastic molded article.

FIG. 4 shows the sheet-shaped reinforcing fiber substrate (quasi-woven fabric) 20, which is designed to produce, for example, a fiber reinforced plastic molded article having a shape similar to the hood of an automobile. In the case of the sheet-shaped reinforcing fiber substrate (quasi-woven fabric) 20, the minimum unit is the same as in FIG. 2c, which shows the minimum unit in the sheet-shaped reinforcing fiber substrate (quasi-woven fabric) 10, reinforcing fiber bundles are joined together in at least part of the intersection regions where any reinforcing fiber bundle, among the plurality of all reinforcing fiber bundles belonging to the even-numbered layers, that is adjacent to any of the reinforcing fiber bundles in the even-numbered layers only on one side thereof or any reinforcing fiber bundle, among the plurality of all reinforcing fiber bundles belonging to the odd-numbered layers, that is adjacent to any of the reinforcing fiber bundles in the odd-numbered layers only on one side thereof intersects any other reinforcing fiber bundle. Thus, except for the difference in the number and length in the length direction of the reinforcing fiber bundles 21 to 24, this is basically an application of the sheet-shaped reinforcing fiber substrate (quasi-woven fabric) 10' to a practical molded automobile hood.

In this way, a sheet-shaped reinforcing fiber substrate (quasi-woven fabric) may be designed to an appropriate contour according to the shape of the intended fiber reinforced plastic molded article, but in principle, the contour is identical to the two-dimensionally unfolded shape of the three dimensional fiber reinforced plastic molded article. From the viewpoint of product quality and material yield, however, it is desirable to modify the contour appropriately in consideration of the behaviors of various parts that can occur when a sheet-shaped reinforcing fiber substrate (quasi-woven fabric) is molded into a three dimensional shape.

In the sheet-shaped reinforcing fiber substrates (quasi-woven fabrics) 10 and 10', the reinforcing fiber bundles 11 and the reinforcing fiber bundles 13, which belong to odd-numbered layers, are basically parallel to each other, and so are the reinforcing fiber bundles 12 and the reinforcing fiber bundles 14, which belong to even-numbered layers, but it is permissible for them to be partly nonparallel depending on the shape of the intended fiber reinforced plastic molded article. Specifically, the reinforcing fiber bundles may be inclined at appropriately designed angles in some area unless any reinforcing fiber bundle in an odd-numbered layer or any reinforcing fiber bundle in an even-numbered layer overlaps another reinforcing fiber bundle in the same layer. It means that as long as the requirement for the clearance between mutually adjacent reinforcing fiber bundles is met, it is permissible for them to be inclined by an angle larger than the aforementioned parallelism range (±2°). As an example of such an area in which they are inclined by an angle larger than the aforementioned parallelism range (±2°), FIG. 5 shows the sheet-shaped reinforcing fiber substrate (quasi-woven fabric) 30 in which the reinforcing fiber bundles 31 to 34 are inclined at random angles. The sheet-shaped reinforcing fiber substrate (quasi-woven fabric) 30 has basically the same structure as the sheet-shaped reinforcing fiber substrate (quasi-woven fabric) 10' except that the reinforcing fiber bundles 31 and the reinforcing fiber bundles 33, which belong to odd-numbered layers, and also the reinforcing fiber bundles 32 and the reinforcing fiber bundles 34, which belong to even-numbered layers, are not parallel to each other.

FIG. 6 shows the sheet-shaped reinforcing fiber substrate (quasi-woven fabric) 40 in which the reinforcing fiber bundles 41 and the reinforcing fiber bundles 43, which belong to odd-numbered layers, and also the reinforcing fiber bundles 42 and the reinforcing fiber bundles 44, which belong to even-numbered layers, are parallel to each other, but the length direction of the reinforcing fiber bundles in the odd-numbered layers makes an angle of 45° with the length direction of the reinforcing fiber bundles in the even-numbered layers. The sheet-shaped reinforcing fiber substrate (quasi-woven fabric) 40 has basically the same structure as the sheet-shaped reinforcing fiber substrate (quasi-woven fabric) 10' except that the length direction of the reinforcing fiber bundles in the odd-numbered layers makes an angle of 45° with the length direction of the reinforcing fiber bundles in the even-numbered layers, that the number of reinforcing fiber bundles belonging to an odd-numbered layer is different from the number of reinforcing fiber bundles belonging to an even-numbered layer, and that the reinforcing fiber bundles belonging to a layer do not necessarily have the same length.

Thus, the inclination angle of each reinforcing fiber bundle can be set appropriately as in the sheet-shaped reinforcing fiber substrates (quasi-woven fabrics) 30 and 40 if the clearance between reinforcing fiber bundles is adjusted appropriately in such a manner that any reinforcing fiber bundle in an odd-numbered layer or any reinforcing fiber bundle in an even-numbered layer does not overlap any other reinforcing fiber bundle in the same layer.

However, although the angle between the length direction of the reinforcing fiber bundles in odd-numbered layers and the length direction of the reinforcing fiber bundles in even-numbered layers may be set as desired within the range of 45° to 90°, the aforementioned angle at 45° can cause a decrease in the maximum permissible deformation depending on the direction of deformation when, for example, the sheet-shaped reinforcing fiber substrate (quasi-woven fabric) 40 undergoes in-plane shear deformation under an external force. Compared to this, the same maximum permissible degree of deformation can be ensured equally in all directions when the aforementioned angle is 90°. Accordingly, an angle of 90° is more preferred to allow a sheet-shaped reinforcing fiber substrate (quasi-woven fabric) to have a better structure.

The value of N, i.e. the number of layers composed of reinforcing fiber bundles, is 4 in all the sheet-shaped reinforcing fiber substrates (quasi-woven fabrics) 10, 10', and 20 to 40, but this is not necessarily limited to 4. The value of N, i.e. the number of layers, may be increased to, for example, 6 or 8 if the clearance between reinforcing fiber bundles is adjusted appropriately.

In the case where value of N, i.e. the number of layers, is 2, however, it is necessary for the reinforcing fiber bundles to be joined together in all regions where they overlap because it is impossible to maintain the sheet form by the friction that occurs in the regions where the reinforcing fiber bundles directly overlap. For this reason, as in the case of a sheet-shaped reinforcing fiber substrate produced by the fiber placement method, easy in-plane shear deformation, such as in woven fabric substrates, cannot be realized, and accordingly, the value of N, i.e. the number of layers composed of reinforcing fiber bundles, should be an integer of 3 or more.

As examples of the above case, FIG. 7 shows the sheet-shaped reinforcing fiber substrate (quasi-woven fabric) 50 for which the value of N, i.e. the number of layers composed of the reinforcing fiber bundles 51 to 56, is 6, and FIG. 8 shows the sheet-shaped reinforcing fiber substrate (quasi-woven fabric) 60 for which the value of N, i.e. the number of layers composed of the reinforcing fiber bundles 61 to 68, is 8. The sheet-shaped reinforcing fiber substrates (quasi-woven fabrics) 50 and 60 are formed on basically the same concept as for the sheet-shaped reinforcing fiber substrate (quasi-woven fabric) 10' except for the differences in the number of layers composed of the reinforcing fiber bundles 51 to 56 or the reinforcing fiber bundles 61 to 68, the number of reinforcing fiber bundles in each of them, and their length in the length direction.

Thus, the value of N, i.e. the number of layers, can be set as desired in the integer range of 3 or more as in the sheet-shaped reinforcing fiber substrates (quasi-woven fabrics) 50 and 60 if the clearance between reinforcing fiber bundles is adjusted appropriately in such a manner that any reinforcing fiber bundle in an odd-numbered layer or any reinforcing fiber bundle in an even-numbered layer does not overlap any other reinforcing fiber bundle in the same layer.

Here, if, for example, the intended fiber reinforced plastic molded article is to be used as an external plate member of an automobile, increasing the value of N, i.e. the number of layers composed of reinforcing fiber bundles, to 6 or 8 serves to realize design characteristics that are different from those of generally known woven fabric substrates (for example plain weave substrate).

However, although the value of N, i.e. the number of layers, can be set as desired, such as 6 and 8, in the integer range of 3 or more, in the case of, for example, the reinforcing fiber bundles 52 to 55 and the reinforcing fiber bundles 62 to 67 belonging to the sheet-shaped reinforcing fiber substrates (quasi-woven fabrics) 50 and 60, respectively, a reinforcing fiber bundle forms a three-dimensional intersection with another one after crossing two or more other reinforcing fiber bundles and as a result, the sheet-shaped reinforcing fiber substrates (quasi-woven fabrics) 50 and 60 are likely to undergo slightly uneven in-plane shear deformation when it is deformed under an external force. On the contrary, when the value of N, i.e. the number of layers, is 4 as in the case of the sheet-shaped reinforcing fiber substrates (quasi-woven fabrics) 10 to 40, each reinforcing fiber bundle in the second layer and the third layer forms a three-dimensional intersection with another one after crossing only one other reinforcing fiber bundle, and accordingly, substantially even deformation occurs in the above case. Thus, a sheet-shaped reinforcing fiber substrate (quasi-woven fabric) having a better structure is obtained when the value of N, i.e. the number of layers, is 4.

The aforementioned sheet-shaped reinforcing fiber substrates (quasi-woven fabric) 10, 10', and 20 to 60 have joining points 1E to 6E and 1E' to 6E', where they can be joined by bonding them with a resin binder. Adhesive strength can be developed by heating and softening a resin binder located at each of the joining points 1E to 6E and 1E' to 6E'. There are no specific limitations on the method to be used to heat the resin binder, and useful methods include heating with an electric heater, ohmic heating, ultrasonic heating, and dielectric heating.

Instead of a resin binder, an auxiliary thread may be used to join them. There are no specific limitations on the material of the auxiliary thread to be used, but preferred ones include glass fiber, polyester fiber, and nylon fiber.

Thus, there are no specific limitations on the joining method, the type of resin binder and auxiliary thread, etc., as long as they serve to bind the first layer and the N'th layer (i.e. the top layer), which are composed of reinforcing fiber bundles, together at the joining points 1E to 6E and 1E' to 6E'. If required, a resin binder and an auxiliary thread may be used in combination to join them.

In this way, binding them at the joining points 1E to 6E and 1E' to 6E' serves to prevent them from suffering structural changes during conveyance. It also serves to prevent the reinforcing fiber bundles from being broken up after moving independently during molding into a three dimensional shape. As a result, a sheet-shaped reinforcing fiber substrate (quasi-woven fabric) having both high handleability and high shapability is obtained.

It is noted that the handleability will decrease if the binding force at the joining points 1E to 6E and 1E' to 6E' is too weak, whereas shear deformation will be restrained at the joining points 1E to 6E and 1E' to 6E' during shaping if it is too strong. Accordingly, it is desirable to adopt a good binding form and conditions to ensure a moderate binding force.

There are no specific limitations on the reinforcing fiber bundles to be used to form a sheet-shaped reinforcing fiber substrate (quasi-woven fabric) according to the present invention as long as they can serve as reinforcing fiber for fiber reinforced plastics. Useful materials include carbon fiber and glass fiber.

In particular, carbon fibers are preferred because they can serve to produce fiber reinforced plastic molded articles that are lightweight and have good mechanical characteristics. It may also be good to combine several kinds of reinforcing fiber bundles that differ in material and type.

As the reinforcing fiber bundles, furthermore, the use of so-called dry type reinforcing fiber bundles intended for RTM, which are not impregnated with resin, is preferred because they serve to produce a sheet-shaped reinforcing fiber substrate (quasi-woven fabric) that behaves ideally as such. However, there are no specific limitations on them, and for example, a tape shaped prepreg already impregnated with resin may serve sufficiently as a reinforcing fiber bundle.

In this case, it is desirable to adopt a prepreg with a surface as small in tackiness (adhesiveness) as possible, because such a prepreg can slip easily when molded into a three dimensional shape and serve to provide a sheet-shaped reinforcing fiber substrate (quasi-woven fabric) that shows high shear deformability.

A conceivable prepreg of this type is one with a surface covered selectively with a thick layer of a nonwoven fabric, powder, etc., of a thermoplastic resin that are solid at room temperature, and this is particularly preferred because it can ensure improved handleability in the overall process for producing a sheet-shaped reinforcing fiber substrate (quasi-woven fabric).

B. Production method for sheet-shaped reinforcing fiber substrate (quasi-woven fabric):

The production method for a sheet-shaped reinforcing fiber substrate (quasi-woven fabric) having a layered structure containing N layers (N being an integer of 3 or more), each formed by arranging a plurality of reinforcing fiber bundles according to the present invention cut to appropriate lengths, includes the steps (a) to (f) given below:

(a) a step for forming the first odd-numbered layer by arranging a plurality of reinforcing fiber bundles parallel to each other in such a manner that the clearance between reinforcing fiber bundles is not smaller than the width of the reinforcing fiber bundles, (b) a step for forming the second layer, i.e. the first even-numbered layer, on top of the first odd-numbered layer by arranging a plurality of reinforcing fiber bundles parallel to each other in such a manner that they are aligned in a direction different from the length direction of the reinforcing fiber bundles belonging to the first odd-numbered layer and that the clearance between the reinforcing fiber bundles is not smaller than the width of the reinforcing fiber bundles, (c) a step for forming the odd-numbered no'th layer (no being an odd number not less than 3 and not more than N) on top of the even-numbered layer located one layer down by arranging a plurality of reinforcing fiber bundles parallel to each other in such a manner that they are aligned in the same direction as the length direction of the reinforcing fiber bundles belonging to the odd-numbered layer located two layers down and do not overlap any of the reinforcing fiber bundles in any of the odd-numbered layers already formed and that the clearance between the reinforcing fiber bundles is not smaller than the width of the reinforcing fiber bundles, (d) in the case where the N value is 4 or more, a step for forming the even-numbered ne'th layer (ne being an even number not less than 4 and not more than N) on top of the odd-numbered layer located one layer down by arranging a plurality of reinforcing fiber bundles parallel to each other in such a manner that they are aligned in the same direction as the length direction of the reinforcing fiber bundles belonging to the even-numbered layer located two layers down and do not overlap any of the reinforcing fiber bundles in any of the even-numbered layers already formed and that the clearance between the reinforcing fiber bundles is not smaller than the width of the reinforcing fiber bundles, (e) in the case where the N value is 5 or more, a step for repeating the step (c) and the step (d) alternately until no or ne reaches the predetermined N value, and (f) a step for joining mutually intersecting reinforcing fiber bundles together in at least part of the intersection regions where a reinforcing fiber bundle belonging to any of the odd-numbered layers directly overlaps a reinforcing fiber bundle belonging to any of the even-numbered layers.

The production method for the sheet-shaped reinforcing fiber substrate (quasi-woven fabric) according to the present invention is described below with reference to FIG. 9. FIG. 9 gives a typical procedure for producing the sheet-shaped reinforcing fiber substrate 20 proposed in FIG. 4.

(a) First, the first layer is formed on a flat layout plane 7S by placing the reinforcing fiber bundles 21 one by one in parallel to each other according to the shape of the intended fiber reinforced plastic molded article. In this step, the clearance between mutually adjacent reinforcing fiber bundles 21 is adjusted in such a manner that it is not smaller than the width of the reinforcing fiber bundles 21 (step 1 in FIG. 9).

(b) Next, the second layer is formed on top of the first layer that is composed of reinforcing fiber bundles 21 by placing the reinforcing fiber bundles 22 one by one in such a manner that they are in parallel to each other and aligned at an angle of 90° to the length direction of the reinforcing fiber bundles 21. In this step, the clearance between mutually adjacent reinforcing fiber bundles 22 is adjusted in such a manner that it is not smaller than the width of the reinforcing fiber bundles 22 (step 2 in FIG. 9).

(c) In addition, the third layer is formed on top of the second layer that is composed of reinforcing fiber bundles 22 by placing the reinforcing fiber bundles 23 one by one in such a manner that they are in parallel to each other and aligned in the length direction of the reinforcing fiber bundles 21 and that they do not overlap the reinforcing fiber bundles 21 (step 3 in FIG. 9).

(d) Finally, the fourth layer is formed on top of the third layer that is composed of reinforcing fiber bundles 23 by placing the reinforcing fiber bundles 24 one by one in such a manner that they are in parallel to each other and aligned in the length direction of the reinforcing fiber bundles 22 and that they do not overlap the reinforcing fiber bundles 22 (step 4 in FIG. 9).

(e) In the case where the value of N, i.e. the number of layers, is 5 or more unlike this example where the number of layers is 4, the aforementioned step (c) (step 3 in FIG. 9) and the step (d) (step 4 in FIG. 9) are repeated alternately until the number of layers reaches the predetermined N value.

(f) After completing the arrangement of all reinforcing fiber bundles 21 to 24, those portions of the first layer composed of the reinforcing fiber bundles 21 and those portions of the fourth layer composed of the reinforcing fiber bundles 24 which directly overlap each other are joined together. In addition, the reinforcing fiber bundle 22', which is one of the reinforcing fiber bundles 22 that is adjacent to any of the reinforcing fiber bundles 24 only on one side thereof, and the reinforcing fiber bundle 23', which is one of the reinforcing fiber bundles 23 that is adjacent to any of the reinforcing fiber bundles 21 only on one side thereof, are joined to reinforcing fiber bundles 23 and 22, respectively, in the regions where they directly overlap (step 5 in FIG. 9).

As a result, the sheet-shaped reinforcing fiber substrate (quasi-woven fabric) 20 is obtained.

There are no specific limitations on the method to be used for arranging the reinforcing fiber bundles 21 to 24, and for example, the fiber placement method may be used for arranging them. If the fiber placement method is adopted, the arrangement of the reinforcing fiber bundles 21 to 24 can be performed rapidly because the device for placing the reinforcing fiber bundles 21 to 24 may be moved to and fro only in one direction while the layout plane 7S is moved and rotated in necessary directions.

It is necessary, however, that the reinforcing fiber bundles 21 to 24 stay exactly where they are arranged. In the case where the reinforcing fiber bundles 21 to 24 have tackiness, those positions of the layout plane 7S where the reinforcing fiber bundles 21 to 24 will be placed or portions of the reinforcing fiber bundles 21 to 24 immediately before their arrangement may be heated moderately in advance using an electric heater, laser, etc.

In the case where the reinforcing fiber bundles 21 to 24 are dry type reinforcing fiber bundles free of tackiness, the layout plane 7S is required to have a means of holding the reinforcing fiber bundles 21 to 24. There are no specific limitations on the means, but good examples include adsorption by an electrostatic force and adsorption by a vacuum. It may also be good to use a heat-sensitive sticking sheet.

The invention disclosed herein is not limited to the embodiments shown above and may be realized in other various ways unless departing from the spirit of the invention. Embodiments that correspond to technical features of the structures described in the section "Summary of the invention", for example, can be replaced or combined appropriately in order to achieve some or all of the preferred effects described above. Furthermore, such technical features may be omitted appropriately if they are not described as essential in the present Description.

EXPLANATION OF NUMERALS 10, 10': sheet-shaped reinforcing fiber substrate (quasi-woven fabric)
11, 12, 13, 14, 12', 13': reinforcing fiber bundle
1E, 1E': joining point
11C, 12C, 13C, 14C: clearance between reinforcing fiber bundles
20: sheet-shaped reinforcing fiber substrate (quasi-woven fabric)
21, 22, 23, 24, 22', 23': reinforcing fiber bundle
2E, 2E': joining point
2S: contour of fiber reinforced plastic molded article
30: sheet-shaped reinforcing fiber substrate (quasi-woven fabric)
31, 32, 33, 34: reinforcing fiber bundle
3E, 3E': joining point
40: sheet-shaped reinforcing fiber substrate (quasi-woven fabric)
41, 42, 43, 44: reinforcing fiber bundle
4E, 4E': joining point
50: sheet-shaped reinforcing fiber substrate (quasi-woven fabric)
51, 52, 53, 54, 55, 56: reinforcing fiber bundle
5E, 5E': joining point
60: sheet-shaped reinforcing fiber substrate (quasi-woven fabric)
61, 62, 63, 64, 65, 66, 67, 68: reinforcing fiber bundle
6E, 6E': joining point
7S: layout plane

The invention claimed is:

1. A sheet-shaped reinforcing fiber substrate having a layered structure containing N layers, wherein the form of the sheet is maintained by reinforcing fiber bundles in odd-numbered layers and reinforcing fiber bundles in even-numbered layers being joined together selectively in a first portion of the intersection regions, wherein the sheet-shaped reinforcing fiber substrate is, maintained by the friction in a second portion between reinforcing fiber bundles in regions where they directly overlap each other, wherein N is an even number of 4 or more, which is produced by arranging a plurality of reinforcing fiber bundles with any length, including:
a first layer in which mutually adjacent reinforcing fiber bundles are aligned parallel to each other in such a manner that the clearance between the mutually adjacent reinforcing fiber bundles is not smaller than the width of the reinforcing fiber bundles,
a second layer which is disposed on top of the first layer and in which mutually adjacent reinforcing fiber bundles are aligned parallel to each other in such a manner that they are in a direction different from the length direction of the reinforcing fiber bundles in the first layer and that the clearance between the mutually adjacent reinforcing fiber bundles is not smaller than the width of the reinforcing fiber bundles,
the (n-1)'th layer, wherein n is an even number not less than 4 and not more than N, which is disposed on top of the (n-2)'th layer and in which mutually adjacent reinforcing fiber bundles are aligned parallel to each other in such a manner that they are in the same direction as the length direction of the reinforcing fiber bundles in the (n-3)'th layer and do not overlap any of the reinforcing fiber bundles in the first and all other odd-numbered layers up to the (n-3)'th layer and that the clearance between the mutually adjacent reinforcing fiber bundles is not smaller than the width of the reinforcing fiber bundles, and
the n'th layer which is disposed on top of the (n-1)'th layer and in which mutually adjacent reinforcing fiber bundles are aligned parallel to each other in such a manner that they are in the same direction as the length direction of the reinforcing fiber bundles in the (n-2)'th layer and do not overlap any of the reinforcing fiber bundles in the second and all other even-numbered layers up to the (n-2)'th layer and that the clearance between the mutually adjacent reinforcing fiber bundles is not smaller than the width of the reinforcing fiber bundles, wherein
such layers are stacked repeatedly until n reaches N and mutually intersecting reinforcing fiber bundles are joined together in at least part of the intersection regions where reinforcing fiber bundles in the first layer directly overlap reinforcing fiber bundles in the N'th layer, and
reinforcing fiber bundles are at least partially further joined together in each of the intersection regions (i) and (ii) below:
intersection regions (i) where any reinforcing fiber bundle, among the plurality of all reinforcing fiber bundles belonging to the even-numbered layers, that is adjacent to any of the reinforcing fiber bundles in the even-numbered layers only on one side thereof, intersects any other reinforcing fiber bundle; and
intersection regions (ii) where any reinforcing fiber bundle, among the plurality of all reinforcing fiber bundles belonging to the odd-numbered layers, that is adjacent to any of the reinforcing fiber bundles in the odd-numbered layers only on one side thereof, intersects any other reinforcing fiber bundle.

2. A sheet-shaped reinforcing fiber substrate as set forth in claim 1, wherein mutually intersecting reinforcing fiber bundles are joined together in all of the intersection regions (i) and (ii) below:
intersection regions (i) where any reinforcing fiber bundle, among the plurality of all reinforcing fiber bundles belonging to the even-numbered layers, that is adjacent to any of the reinforcing fiber bundles in the even-numbered layers only on one side thereof, intersects any other reinforcing fiber bundle; and
intersection regions (ii) where any reinforcing fiber bundle, among the plurality of all reinforcing fiber bundles belonging to the odd-numbered layers, that is adjacent to any of the reinforcing fiber bundles in the odd-numbered layers only on one side thereof, intersects any other reinforcing fiber bundle, and all of the intersection regions where reinforcing fiber bundles in the first layer directly overlap reinforcing fiber bundles in the N'th layer.

3. A sheet-shaped reinforcing fiber substrate as set forth in claim 1, wherein each reinforcing fiber bundle is designed to have a length in the length direction that allows the contour to be identical to a shape of an intended fiber reinforced plastic molded article.

4. A sheet-shaped reinforcing fiber substrate as set forth in claim 1, wherein the angle between the length direction of the reinforcing fiber bundles belonging to the odd-numbered layers and the length direction of the reinforcing fiber bundles belonging to the even-numbered layers is anywhere in the range of 45° to 90°.

5. A sheet-shaped reinforcing fiber substrate as set forth in claim 1, wherein the value of N is 4.

6. A sheet-shaped reinforcing fiber substrate as set forth in claim 1, wherein the reinforcing fiber bundles are joined together with a resin binder.

7. A sheet-shaped reinforcing fiber substrate as set forth in claim 1, wherein the reinforcing fiber bundles are joined together by stitching with an auxiliary thread.

8. A sheet-shaped reinforcing fiber substrate as set forth in claim 1, wherein the reinforcing fiber bundles are of carbon fiber.

* * * * *